United States Patent
Ryan et al.

(10) Patent No.: US 6,678,628 B2
(45) Date of Patent: Jan. 13, 2004

(54) APPARATUS AND METHODS FOR MONITORING AND TESTING COOLANT RECIRCULATION SYSTEMS

(76) Inventors: William J. Ryan, 293 Cilley Hill Rd., Jericho, VT (US) 05465; John W. Berube, 32 Porterfield La., Waynesboro, VA (US) 22980; Peter D. Hazelton, 4 Mountain View Rd., Jericho, VT (US) 05465

(*) Notice: Subject to any disclaimer, the term of this patent is extended or adjusted under 35 U.S.C. 154(b) by 14 days.

(21) Appl. No.: 10/046,947

(22) Filed: Jan. 14, 2002

(65) Prior Publication Data

US 2003/0139894 A1 Jul. 24, 2003

(51) Int. Cl.[7] ............................. G06F 15/00; G01K 17/06
(52) U.S. Cl. ............................. 702/132; 62/3.7; 62/342; 73/190; 180/65.3; 374/45; 702/182
(58) Field of Search ............................. 702/132, 136, 702/138, 182; 73/190, 112, 861.24, 865.9; 62/3.7, 342; 180/65.3; 374/45, 7, 40, 43; 165/13, 245, 295; 361/385; 29/890.046

(56) References Cited

U.S. PATENT DOCUMENTS

| | | |
|---|---|---|
| 3,593,578 A | 7/1971 | Farrell et al. |
| 3,631,717 A | 1/1972 | Kato et al. |
| 3,918,300 A | 11/1975 | Weisstuch et al. |
| 4,006,633 A * | 2/1977 | Shipman et al. ............... 73/190 |
| 4,024,751 A | 5/1977 | Potrzebowski |
| 4,201,518 A | 5/1980 | Stevenson |
| 4,479,727 A * | 10/1984 | Domingorena et al. ....... 374/45 |
| 4,729,667 A | 3/1988 | Blangetti et al. |
| 4,766,553 A | 8/1988 | Kaya et al. |
| 5,035,052 A | 7/1991 | Suzuki et al. |
| 5,177,975 A | 1/1993 | Mertens |
| 5,215,704 A | 6/1993 | Hirota |
| 5,318,099 A | 6/1994 | Zivalich, Jr. |
| 5,343,762 A | 9/1994 | Beulke |
| 5,353,653 A | 10/1994 | Watanabe et al. |
| 5,396,810 A | 3/1995 | Beulke |
| 5,399,017 A | 3/1995 | Droege |
| 5,584,183 A * | 12/1996 | Wright et al. ................. 62/3.7 |
| 5,828,712 A | 10/1998 | Laurent et al. |
| 5,913,614 A | 6/1999 | Smith et al. |
| 5,915,343 A | 6/1999 | Zenobi |
| 5,927,400 A | 7/1999 | Bononi et al. |
| 6,079,950 A | 6/2000 | Seneff |
| 6,086,828 A | 7/2000 | Thompson |
| 6,330,925 B1 * | 12/2001 | Ovshinsky et al. ......... 180/65.3 |
| 6,494,055 B1 * | 12/2002 | Meserole et al. ............. 62/342 |

FOREIGN PATENT DOCUMENTS

| | | |
|---|---|---|
| DE | 2711437 A1 | 9/1978 |
| DE | 3430947 A | 3/1986 |
| JP | 57-47199 A | 3/1982 |
| SU | 981819 A | 12/1982 |

OTHER PUBLICATIONS

Chung et al., Pub.No.: US2002/0016656 A1, "Cooling system controller for vehicle", Filed Date: Jul. 6, 2001.*

Keegan, Pub. No.: US 2003/0003344 A1, "Fluid distribution surface for solid oxide fuel cells", Filed Date: Jun. 27, 2001.*

* cited by examiner

*Primary Examiner*—John Barlow
*Assistant Examiner*—John Le
(74) *Attorney, Agent, or Firm*—Theodore R. Touw

(57) ABSTRACT

Apparatus for monitoring, characterizing, and testing coolant recirculation systems has, in combination, a heat load, a flow meter measuring flow rate of the coolant, inlet and outlet thermometers, and a data recorder connected to the flow meter, inlet thermometer, and outlet thermometer for recording their data outputs. The data recorder has an output representing flow rate, coolant inlet temperature, and coolant outlet temperature, whereby the coolant-recirculating heat exchanger system is characterized. A computer connected to the data recorder output is operable for computing heat removal capacity. The apparatus is specially adapted for methods of monitoring, characterizing, and testing coolant recirculation systems, including determining their maximum heat removal capacities.

29 Claims, 6 Drawing Sheets

APPARATUS AND METHODS FOR MONITORING AND TESTING COOLANT RECIRCULATION SYSTEMS

COPYRIGHT NOTICE AND AUTHORIZATION

This patent document contains material which is subject to copyright protection. The copyright owner has no objection to the facsimile reproduction by anyone of the patent disclosure, as it appears in the Patent and Trademark Office patent files or records of any country, but otherwise reserves all rights whatsoever.

FIELD OF THE INVENTION

This invention relates generally to coolant recirculation systems and, more particularly, to apparatus and methods for monitoring, characterizing, and testing coolant recirculation systems.

BACKGROUND OF THE INVENTION

Various industries, including the semiconductor manufacturing facilities, general manufacturing industries, and military organizations, regularly utilize cooling systems with heat exchangers and recirculating coolant. In these industries and elsewhere, such recirculating-coolant heat-exchanger cooling systems are used to remove excess heat in naval vessels, manufacturing process equipment, HVAC installations, etc. Expensive failures of these systems can be the result of many factors, including fouling, inadequate flow, and excessive heat load. When a need occurs to provide for cooling new equipment or to add additional equipment load onto an existing cooling system, there is often uncertainty as to the actual heat removal capacity and reliability of the proposed new system or the existing system. Thus there is a need for apparatus and methods for consistent, reproducible, quantitative testing and characterization of coolant recirculation systems.

DESCRIPTION OF THE RELATED ART

U.S. Pat. No. 4,201,518 to Stevenson discloses a recirculating hot-water pump control system.

U.S. Pat. No. 3,593,578 to Farrell et al. discloses an apparatus for measuring the amount of heat absorbed or given up by a heat-transferring structure such as a heat exchanger. The apparatus comprises a wheel-and-disc type integrator having a disc coupled to a volumetric flowmeter output shaft and a wheel positionable on the disk by a dual bellows assembly which measures the inlet and outlet temperatures of the heat exchanger. A differential mechanism has an output drive connected to a counter for totalizing the amount of heat transferred relative to the heat exchanger.

U.S. Pat. No. 3,631,717 to Kato et al. discloses a calorie-measuring device comprising a flowmeter arranged in a pipeline through which a heat carrier flows to a load wherein heat is emitted or absorbed. A device provides a signal indicative of difference between temperatures before and after the load, and a further device serves for multiplying the values of flow quantity and temperature difference to indicate the caloric value of heat emitted or absorbed in the load.

U.S. Pat. No. 3,918,300 to Weisstuch et al. discloses a device for measuring the efficiency of a heat exchanger. The device comprises a plurality of temperature sensors, a plurality of difference means, and calculation means which generates a signal representative of the efficiency of the heat exchanger, either the heat transfer coefficient or the fouling factor in the heat exchanger.

U.S. Pat. No. 4,024,751 to Potrzebowski discloses an apparatus for determining heat transfer efficiency of a heat exchanger wall, comprising means for imposing a heat load on a first heat transfer surface of the wall and means for determining the rate of dissipation of the heat load across the wall and into a heat exchange fluid in contact with a second heat transfer surface of the wall.

U.S. Pat. No. 4,479,727 to Domingorena et al. discloses a method and apparatus for evaluating the performance of a heat exchanger, in which water is supplied to the heat exchanger at a known mass flow rate and temperature. The water is directed to traverse a flow path of the heat exchanger. The water is then heated and redirected into another flow path of the heat exchanger in heat exchange relation with the first flow path. The temperature change of the water over a flow path is measured to determine the performance of the heat exchange.

U.S. Pat. No. 4,729,667 to Blangetti et al. discloses a process and device for the determination of the thermal resistance of contaminated heat exchange elements of thermodynamic apparatuses, in particular of power station condensers, using two comparison tube sections which originate from a single condenser tube and of which one is left in the corroded condition and/or the condition encrusted by mineral deposits and the other is brought into the new condition by etching or other cleaning procedures. The two comparison tube sections are conductively connected in series, cooling water flows through them, and they are heated from the outside in a condenser chamber in each case by steam flows of equal power. The temperatures measured at the inlet and outlet positions of the comparison tube sections, the measured values of the mass flow of cooling water, the steam temperatures, and the heat flows in the two condenser chambers permit the determination of the thermal resistance of the incrustation layer of the tube drawn for the purposes of investigation from the condenser. A device for carrying out the process is also described.

U.S. Pat. No. 4,766,553 to Kaya et al. discloses a heat exchanger performance monitor which generates a fouling factor which indicates the level of fouling of a heat exchanger having a heat exchange surface area and through which a heat exchange medium passes having a known specific heat. Temperature transmitters are utilized to obtain values for the input and output temperatures of the heat exchange medium as well as the temperature in the heat exchanger of a heat exchange fluid used to transfer heat to or from the heat exchange medium. Modules are used to generate a value for an actual heat transfer coefficient in the heat exchanger as a function of the temperatures, flow rate, and constant parameters such as area and specific heat, for the heat exchanger. The actual heat transfer coefficient is compared with a nominal or original heat transfer coefficient to determine if any deterioration in the coefficients has occurred which reflects the fouling of the heat exchanger. A simple ratio of the nominal to actual heat transfer coefficient is taken as a measure of this fouling factor.

U.S. Pat. No. 5,035,052 to Suzuki et al. discloses a method of assembling a heat exchanger including a method of determining values of parameters in a heat exchanger, and determining whether the efficiency of the heat exchanger is acceptable. The method includes determining the values of parameters: width of a louver formed in a fin of the heat exchanger, fin pitch, tilt angle of the fin, and tilt angle of the louver.

U.S. Pat. No. 5,177,975 to Mertens discloses apparatus for preparation of process water for presses.

U.S. Pat. No. 5,215,704 to Hirota discloses a method and apparatus for in situ testing of heat exchangers by measuring the heat transfer capabilities of an individual tube. A relatively small reservoir of service fluid is connected to the inlet and outlet ports of a tube. The reservoir is provided with a heater or chiller and the service fluid is circulated through the tube. When a steady state is reached, the heat transfer characteristics of the tube are measured using known mathematical relationships.

U.S. Pat. No. 5,318,009 to Zivalich, Jr. discloses a method and apparatus for emulating a perimeter induction unit air conditioning system.

U.S. Pat. Nos. 5,343,762 and 5,396,810 to Beulke disclose vortex flow meters for measuring fluid flow, each including a conduit having a wall surrounding a bore for carrying the fluid along a bore axis. A pivoting member moves in response to vortices in the fluid and extends from a hole in the wall into the bore, and sensing means is provided for sensing the motion of the pivoting member to provide an output indicative of flow.

U.S. Pat. No. 5,353,653 to Watanabe et al. discloses a heat exchanger abnormality monitoring system having heat-exchange tubes for heating feed water with extraction steam, an inlet and an outlet for the feed water, and a drain cooling zone, includes a process input, an apparatus for calculating the differential pressure between the feed water pressures at the inlet and outlet, an apparatus for computing the heat exchanging performance of the heat exchanger, and judgement apparatus for monitoring the differential pressure and the heat exchanging performance, thereby judging the presence or absence of scale accretion within the heat exchanger and, whenever scale accretion is present, judging the specific locations of the scale accretion in the inner and outer surfaces of the heat-exchange tubes, fluid flow distribution passageways, and devices other than the heat-exchange tubes.

U.S. Pat. No. 5,399,017 to Droege discloses a method for evaluating the type, extent, and threshold of fouling in a heat exchanger test tube by using a reference test block to measure a reference thermal relaxation time at a guaranteed clean reference section of a heat exchanger test tube and comparing the reference thermal relaxation time with thermal relaxation times measured at the bottom region of unclean sections of the heat exchanger test tube.

U.S. Pat. No. 5,828,712 to Laurent et al. discloses a coolant water flow rate test using a nonradioactive tracer agent in operation of a water-cooled nuclear fission reactor. U.S. Pat. No. 5,913,614 to Smith et al. discloses a recirculating plumbing system in which the dispensing temperature and flow of clean water are adjusted. U.S. Pat. No. 5,915,343 to Zenobi discloses a system for rapid cooling of engines on a test bench.

U.S. Pat. No. 5,927,400 to Bononi et al. discloses a device and method for the adjustment of the flow rate of a liquid which circulates within thermal convectors or heat exchangers making up part of heating, conditioning or ventilation plants, or apparatus for the thermal treatment of products. The device comprises a body within which a movable shutter is provided, the position of which allows for adjusting the quantity of liquid flowing between at least an inlet duct and an outlet duct, the positioning of the shutter being obtained by way of a suitable actuator. The device also comprises a control circuit and an instant flow rate and/or quantity meter of the liquid flowing in one of said ducts, for the automatic and continuous adjustment of the flow, by way of the appropriate positioning of the shutter.

U.S. Pat. No. 6,079,950 to Seneff discloses a pool recirculation control system for a swimming pool or spa. A temperature sensor supplies a signal to a controller to cause a pump to be operated for a longer period of time when the water temperature is above a predetermined threshold temperature, and to be operated for a shorter period of time when the water temperature is below the predetermined threshold.

U.S. Pat. No. 6,086,828 to Thompson discloses a method of heat exchanger efficiency control by differential temperature in which a regenerative thermal oxidizer includes a number of heat exchange columns topped by a combustion chamber. Contaminated air is directed into one of the columns and oxidation is completed as the flow passes through the combustion chamber. From the combustion chamber, the now clean air flows vertically downward through another column and then is directed via an outlet through an outlet manifold and released to atmosphere or recirculated back to the oxidizer. A combustible fuel is added to the contaminated air prior to its entry into one of the columns. The addition of the combustible fuel is regulated by continuously monitoring the inlet and outlet temperatures and comparing a difference between these temperatures to a predetermined value. Further control is achieved by measuring the flow of contaminated air to the oxidizer via pressure differential and coordinating that measurement with the temperature differential measurement.

SUMMARY OF THE INVENTION

The present invention is an apparatus for evaluating the heat removal capacity of chilled-coolant-recirculating systems, such as chilled-water-recirculating systems. The apparatus includes a heat load having an inlet and an outlet for coolant, a flow meter for measuring coolant flow rate, inlet and outlet thermometers for measuring temperatures of coolant at inlet and outlet, and a data recorder connected to the flow meter, inlet thermometer, and outlet thermometer for recording their data outputs, which are used for characterizing the coolant-recirculating heat exchanger system. The apparatus may also include an optional computer operable for calculating heat removal capacity. The computer may be connected to the data recorder, or the data recorder may be integral with the computer. A computer may also be used to aid in controlling various operating parameters.

The apparatus measures at least coolant flow rate and inlet coolant temperature and return (outlet) coolant temperature. It then calculates the amount of heat removed, using conventional energy-transfer equations. In addition to coolant flow rate and temperature measurements, the apparatus measures inlet and outlet pressure to determine pressure drop and pressure stability. Optionally, it may also measure one or more temperatures associated with equipment to be cooled, especially to ensure that any critical maximum temperatures are not exceeded. The apparatus enables users to monitor and control the efficiency of their heat exchangers. Monitoring and controlling flow rate and temperature can help users to maximize the efficiency of heat exchanger installations, potentially resulting in substantial energy savings over time. With the present apparatus, companies with chilled water systems can identify chilled water system capacity limitations vs. heat load requirements. This can result in major cost savings by avoiding system downtime caused by heat load and capacity imbalance.

In addition to the measuring instruments and the data logger, the apparatus includes a heat load emulator. This device is used with computer software to calculate heat loads from operational equipment or to analyze the heat load capacity of a chilled coolant system with multiple heat sources. The heat load emulator can be directly connected into a chilled-coolant-recirculating system as a heat load source while online equipment is being evaluated. Alternatively, the apparatus can be configured to generate data for chilled-coolant-recirculating system capacity before new or additional equipment is placed online.

DETAILED DESCRIPTION OF THE PREFERRED EMBODIMENTS

Figure 1:
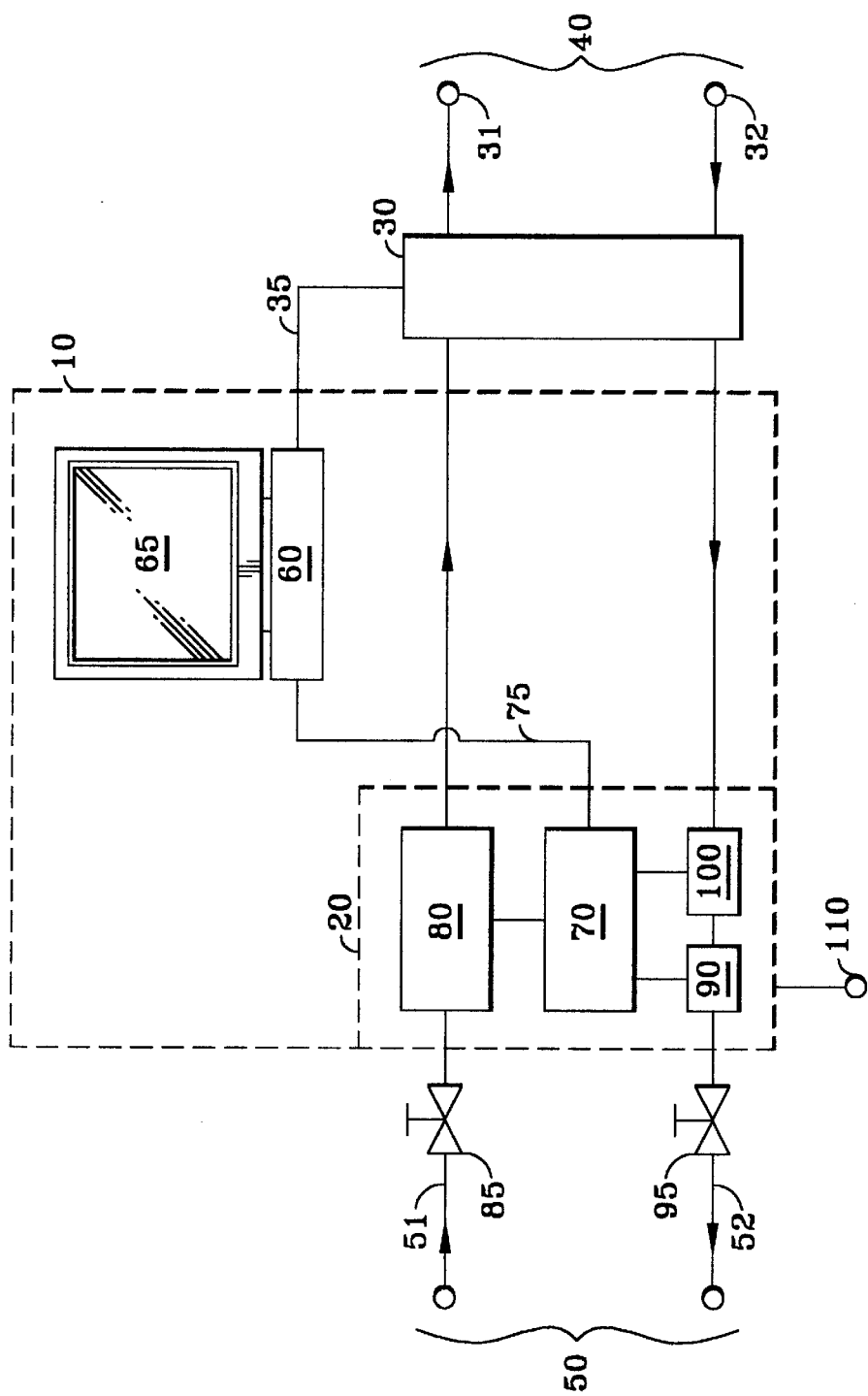
FIG. 1 shows a block diagram of an embodiment of apparatus for testing coolant recirculation systems, made in accordance with the invention.

FIG. 1 shows a block diagram of an apparatus embodiment 10 for testing coolant recirculation systems, made in accordance with the invention. The apparatus 10 includes a monitoring unit portion 20, which connects into an existing closed-loop heat-exchanger system 50 that uses chilled coolant to remove heat generated by heat-generating equipment 40, such as high-power lasers, semiconductor processing equipment, high-power radio-frequency (RF) transmitters, or weapons systems.

As shown in FIG. 1, the monitoring unit portion 20 of apparatus 10 includes a mass flow sensor 80, at least one pressure sensor 100, and at least one temperature sensor 90. These instruments are used to sense temperature, pressure, and flow rate. Several methods are used in industry for measuring flow rates of liquids, including the differential pressure, turbine, Coriolis mass, magnetic, positive displacement, ultrasonic, and vortex methods. The flow meter portion of the present apparatus may consist of commercially available flow-measuring instrumentation which has been built or modified to require only a single pipe penetration to monitor flow rate, static pressure, and temperature. In addition, the apparatus contains a data logger 70 that allows the user to track and record the sensed parameters over time. Having the recorded parameter values, the user can create tables and trend plots, utilizing routines that are resident in the data logger or in a computer 60, which may have a display 65. Thus, the data can be transferred, e.g., by a serial I/O connection 75 to a computer 60, such as a general purpose computer programmable with instructions to perform a variety of analyses. Computer 60 may be integral with the apparatus or may be remotely located. The functions of data logger 70 may be performed by computer 60, i.e., data logger 70 may be integral with computer 60, its functions being performed by a software program operable by computer 60. In that case, serial I/O connection 75 may not be necessary and may be omitted or used for another purpose.

The apparatus also comprises one or more heat-load emulators 30 (i.e., dummy heat loads). Data logger 70 may include meter transmitters powered by a 25 VDC power supply. Primary power source 110 may be conventional AC power or batteries. Typically, the facility's chilled water supply is connected to the supply inlet leg 51. The outlet port in the return leg 52 will be connected to the return piping for the same chilled water system. The heat-load emulator(s) 30 are connected between the supply outlet port 31 and the return inlet port 32. A throttle valve 85 may be provided in supply inlet line 51. An isolation valve 95 may be provided in return line 52. Heat-load emulator(s) 30 may be controlled by computer 60 or its equivalent through a control connection 35. Equivalents to computer 60 in this context include digital signal processors, programmable controllers, and embedded controllers such as embedded microcomputers, each being programmed to provide suitable control functions, described below.

For various purposes, heat-load emulator(s) 30 may be connected either in parallel with heat-generating equipment 40, as shown in FIG. 1, in series with heat-generating equipment 40, or in substitution for heat-generating equipment 40. The latter substitutional mode is especially useful for preparing a coolant recirculation system for cooling heat-generating equipment 40 that is not yet available. For example, heat-generating equipment 40 itself may not yet be fabricated or even fully developed.

For a given flow rate, the desired heat output is determined by calculating a differential temperature required for a specific output using a conventional known energy equations. The outlet temperature is set (e.g., by a thermostat) to a value equivalent to the cumulative sum of the calculated differential and the inlet supply temperatures.

Figure 2:
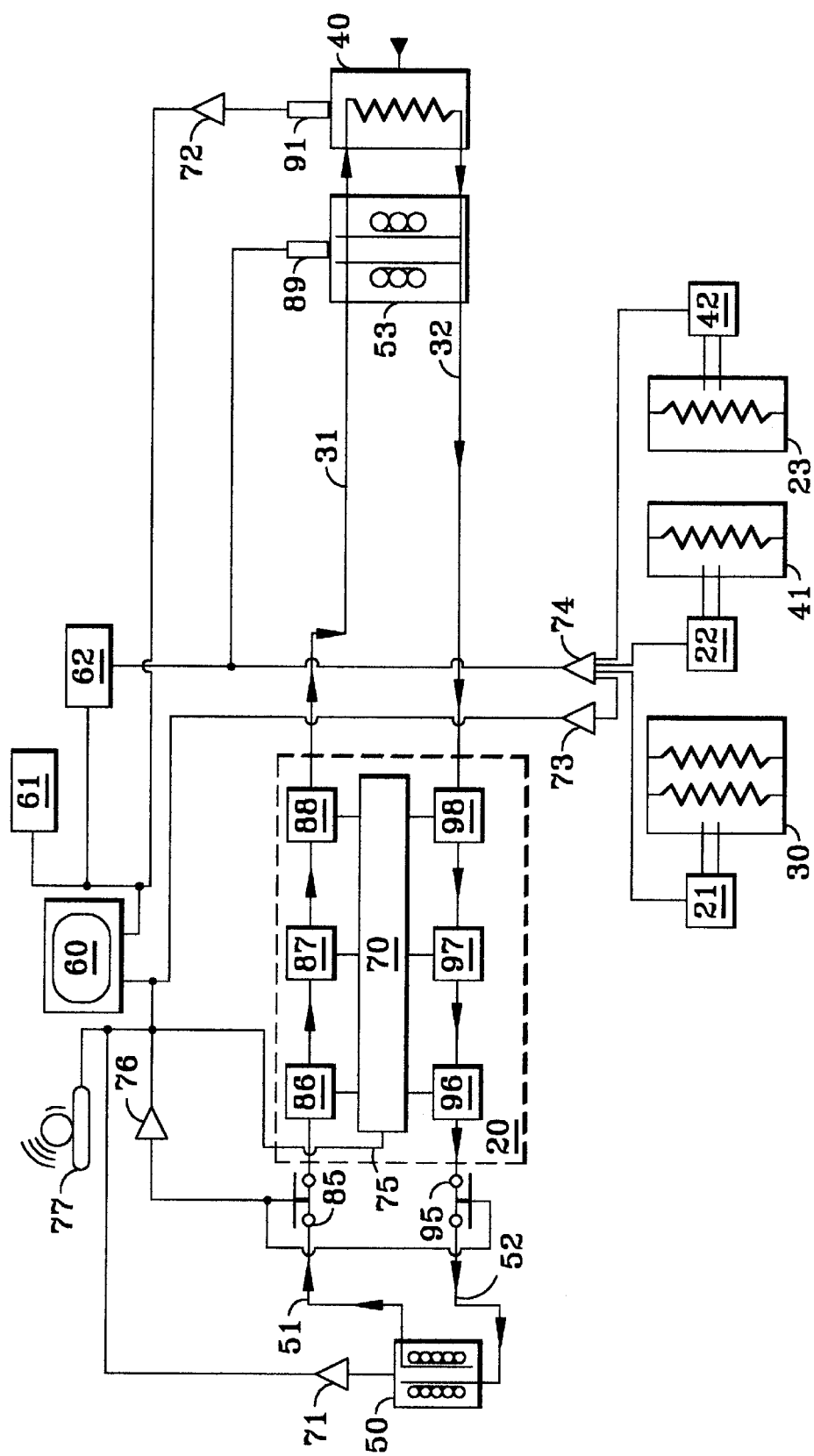
FIG. 2 shows a detailed block diagram of a system embodiment.

FIG. 2 shows a more detailed block diagram of apparatus 10 for testing coolant recirculation systems. The monitoring unit portion 20, heat-load emulator 30, supply outlet port 31, return inlet port 32, heat-generating equipment 40, existing closed-loop coolant-recirculating system 50 to be tested, supply inlet line 51, return line 52, computer 60, serial I/O connection 75, throttle valve 85, and isolation valve 95 all correspond to the elements having the same reference numerals in FIG. 1. In the following detailed description, specific sensors are described, corresponding to mass flow sensor 80, pressure sensor 100, and temperature sensor 90 of FIG. 1.

Coolant-recirculating system 50 has a heat exchanger 53. As mentioned above, heat-load emulator 30 may be substituted for actual heat-generating equipment 40 in some circumstances. In the embodiment shown in FIG. 2, data logger 70 is a signal processor which also receives inputs from temperature sensor 86, mass flow sensor 87, pressure sensor 88, differential temperature sensor 96, differential flow sensor 97, and differential pressure sensor 98. Additional temperature sensors 89 and 91 are used to directly monitor temperatures of the heat exchanger 53 and/or heat-generating equipment 40 respectively. A programmable logic controller (PLC) 71 or functional equivalent can increase or decrease water temperature. Another PLC 72 can trigger an alarm 77 and/or shut down the system if necessary. Other PLC's 73 and/or 74 can select heat-load emulator 30 and/or additional heat-generating equipment 41 and/or 42. Each of the additional heat-generating equipment 41 and/or 42 can have a dedicated individual monitoring unit, e.g., 21, 22, or 23. Another PLC 76 can increase or decrease flow.

The apparatus shown in FIGS. 1 and 2 and described above is especially adapted for use in the methods described below.

Methods

Figure 3:
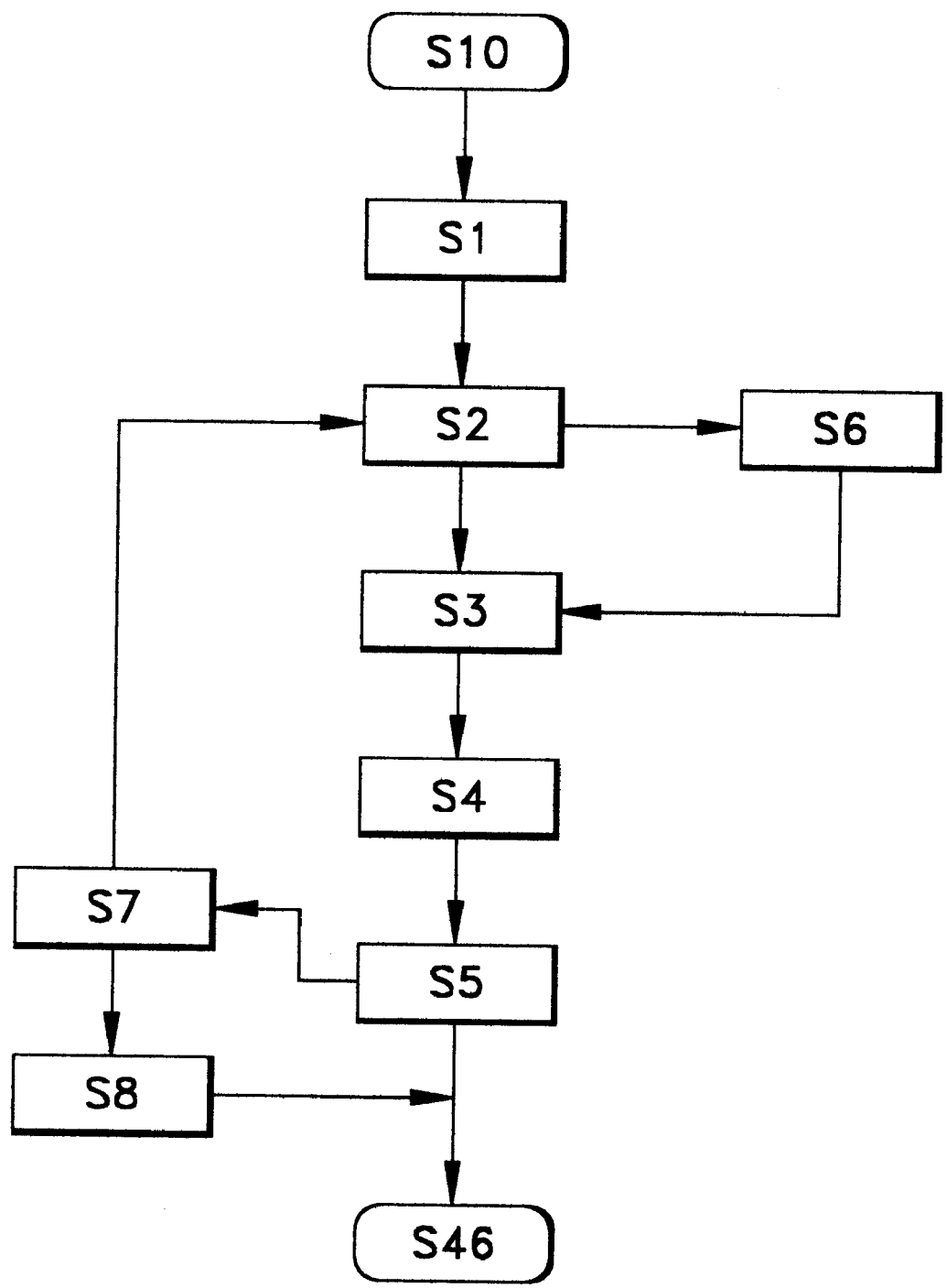
FIG. 3 shows a flow diagram of an overall method for testing coolant recirculation systems, performed in accordance with the invention.

FIG. 3 shows a flow diagram of a method for testing coolant recirculation systems, performed in accordance with the invention. The overall method evaluates heat removal capacity of a coolant-recirculating heat exchanger system, by performing the steps of: S1 providing a heat load having an inlet and an outlet, S2 measuring coolant flow rate, S3 measuring coolant temperature at the inlet and recording an inlet temperature, S4 measuring coolant temperature at the outlet and recording an outlet temperature, and S5 using the coolant flow rate, inlet temperature, and outlet temperature to calculate heat removal capacity of the system. Optionally, according to the purpose and circumstances of the testing, a step S6 may be performed of measuring one or more suitable temperatures of apparatus to be cooled by the coolant-recirculating heat exchanger system. To determine the maximum heat removal capacity of the system, the heat load of step S1 is increased (step S7) and steps S2 through S5 are repeated, while monitoring a predetermined parameter sensitive to heat. When the predetermined heat-sensitive parameter reaches a predetermined threshold, the maximum heat removal capacity is recorded (step S8). The predetermined parameter sensitive to heat that is monitored in step S7 may be the temperature measured in step S6 at apparatus to be cooled by the coolant-recirculating heat exchanger system, and its predetermined threshold may simply be the maximum nominal apparatus temperature. Or, for another example, the predetermined parameter sensitive to heat that is monitored in step S7 may be a parameter of a product produced by the apparatus being cooled by the coolant-recirculating heat exchanger system.

If, as mentioned above, a heat-load emulator 30 is substituted for the apparatus to be cooled, its heat load is the heat that is increased in step S7, and the predetermined parameter sensitive to heat that is monitored in step S7 may be the coolant return temperature, for example. In situations where a heat-load emulator 30 is provided in parallel or in series with the apparatus to be cooled, again the heat load of heat-load emulator 30 is increased in step S7, and the predetermined parameter sensitive to heat that is monitored in step S7 may again be the coolant return temperature, or may be a temperature of the apparatus to be cooled, or a parameter of a product produced by the apparatus being cooled, etc. In some cases, the threshold that triggers recording and reporting of the maximum heat removal capacity my be a minimum limit of the monitored parameter, rather than a maximum limit.

The parameters of flow rate, pressure, and temperature(s) are monitored and recorded at programmable time intervals to the data logger for the inlet coolant coming through the supply leg from the facility's chilled-coolant system. The coolant passes into the inlet port where it is heated to a specified temperature as set on a thermostat control. The heated coolant exits the heat-load emulator unit's outlet port and enters the inlet of the return leg. The heated coolant temperature and pressure parameters are measured and recorded to the data logger as the water passes through to be returned to the facility's chilled water system. The flow rates through the loop are varied with a throttle valve 85 in the inlet supply leg.

The maximum heat removal capacity of coolant-recirculating heat exchanger system 50 is determined by increasing the heat load of heat-load emulator(s) 30 until a predetermined parameter limit is reached. Some examples of such predetermined parameter limits are a maximum outlet coolant temperature, $T_{out}(max)$, a maximum operating temperature within heat-generating equipment 40, $T_{oper}(max)$, and an out-of-tolerance value for a critical variable observed in use of heat-generating equipment 40. A particular example of the latter type of variable is a critical dimension in semiconductor products made by semiconductor processing equipment cooled by coolant-recirculating system 50.

The calculation performed in step S5 is based on a known relationship (derived from the continuity of mass flow):

$$\frac{dQ_{in}}{dt} = m_f C_p (T_{out} - T_{in}) - m_f P \tag{1}$$

where $dQ_{in}/dt$ is the capacity in units of heat per unit time (e.g., BTU/min.), $m_f$ is the mass flow rate of the coolant (e.g., gallons per minute, GPM), $C_p$ is the known heat capacity of the coolant substance, $T_{out}$ and $T_{in}$ are the outlet and inlet coolant temperatures respectively (° C.), and P is the pressure drop (e.g., atmospheres).

Figure 4:
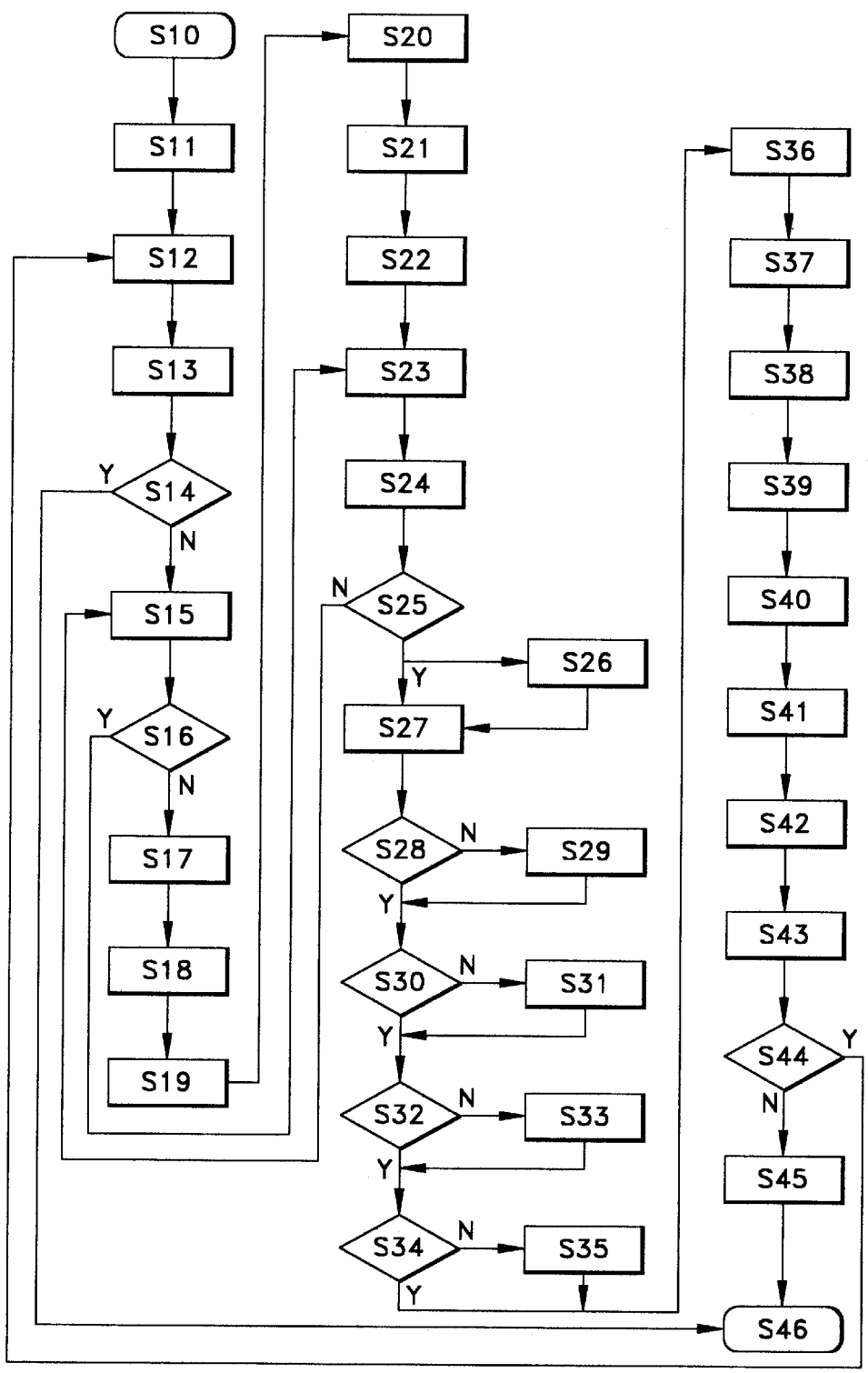
FIG. 4 shows a flow chart of a computer program used in an embodiment of the invention.

FIG. 4 shows a flow chart of a computer-aided method used in an embodiment of the invention, implementing the overall method described above in connection with FIG. 2. As shown in FIG. 4, the computer-aided method comprises steps S10 through S46, including nominal START and END steps (S10 and S46). These steps are summarized in Table 1, following. In FIG. 4, decision steps are conventionally denoted by diamond-shaped blocks with Y and N denoting "Yes" and "No" respectively; the flow to actions taken at these steps are listed in Table 1 under the headings "If YES" and "If NO."

Tables 1 and 2 below list various steps employed, the action or decision taken in each step, and (if a decision) the result for a YES or NO decision.

TABLE 1

Steps of computer-aided method

| Step | Action or decision | If YES | If NO |
|---|---|---|---|
| S10 | START | | |
| S11 | Initialize simulated or actual heat load | | |
| S12 | Initialize system clock | | |
| S13 | Start data collection time interval | | |
| S14 | Data collection time interval complete? | Stop | Continue @ S15 |
| S15 | Initialize data sampling clock | | |
| S16 | N parameters sampled? | Branch to S23 | Continue @ S17 |
| S17 | Increment parameter for S18–S22 | | |
| S18 | Sample inlet pressure | | |
| S19 | Sample inlet temperature | | |
| S20 | Sample inlet flow rate | | |
| S21 | Sample return pressure | | |
| S22 | Sample return temperature | | |
| S23 | Average each parameter over N samples and select time base over which sampled | | |
| S24 | Convert each parameter to calibrated digital value | | |
| S25 | Pressure between Pmin and Pmax? | Continue @ S26 | Repeat from S15 |
| S26 | Optionally, measure temperature at actual device being cooled | | |
| S27 | Store parameter values | | |
| S28 | Pressure between control setpoint min/max? | Continue @ S30 | Perform S29 |

TABLE 1-continued

Steps of computer-aided method

| Step | Action or decision | If YES | If NO |
|---|---|---|---|
| S29 | Activate controller and/or alarm; Continue @ S30 | | |
| S30 | Outlet temperature between control setpoint min/max? | Continue @ S32 | Perform S31 |
| S31 | Activate controller and/or alarm; Continue @ S32 | | |
| S32 | Inlet temperature between control setpoint min/max? | Continue @ S34 | Perform S33 |
| S33 | Activate controller and/or alarm; Continue @ S34 | | |
| S34 | Flow rate between control setpoint min/max? | Continue @ S36 | Perform S35 |
| S35 | Activate controller and/or alarm; Continue @ S36 | | |
| S36 | Calculate and store output temperature difference from input | | |
| S37 | Calculate and store output pressure difference from input | | |
| S38 | Calculate and store mass flow | | |
| S39 | Calculate and store heat removal rate | | |
| S40 | Display averaged parameter data and calculated values in real time | | |
| S41 | Transmit averaged parameter data and calculated values via serial port | | |
| S42 | Store values on media for offline analysis | | |
| S43 | Increment simulated heat load | | |
| S44 | Return temperature less than or equal to specified maximum? | Repeat from S12 | Continue @ S45 |
| S45 | Calculate, store, and display maximum cooling capacity | | |
| S46 | END | | |

Figure 5:
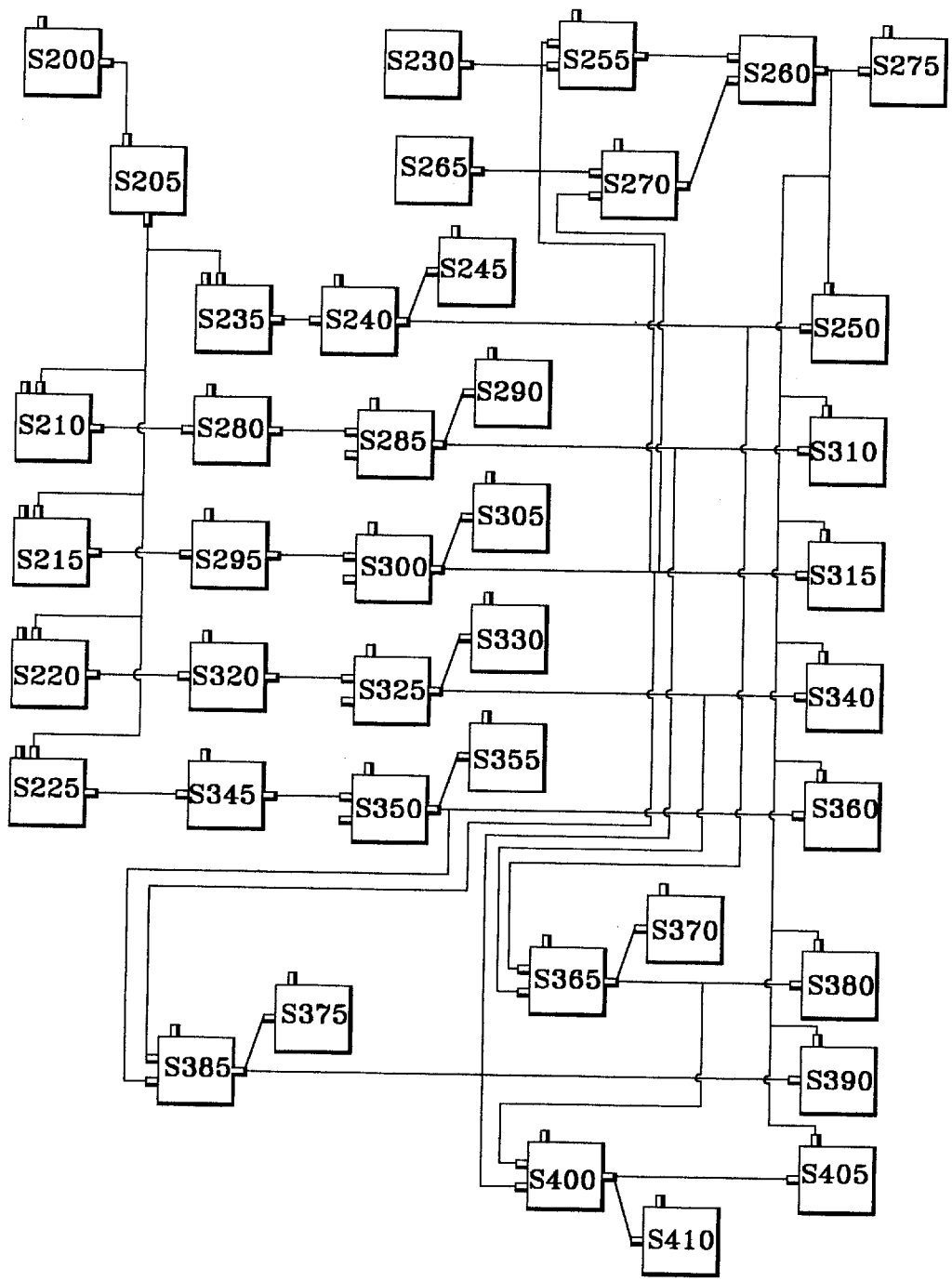
FIGS. 5 and 6 show diagrams illustrating together an embodiment of computer software implementing methods performed in accordance with the invention.
Figure 6:
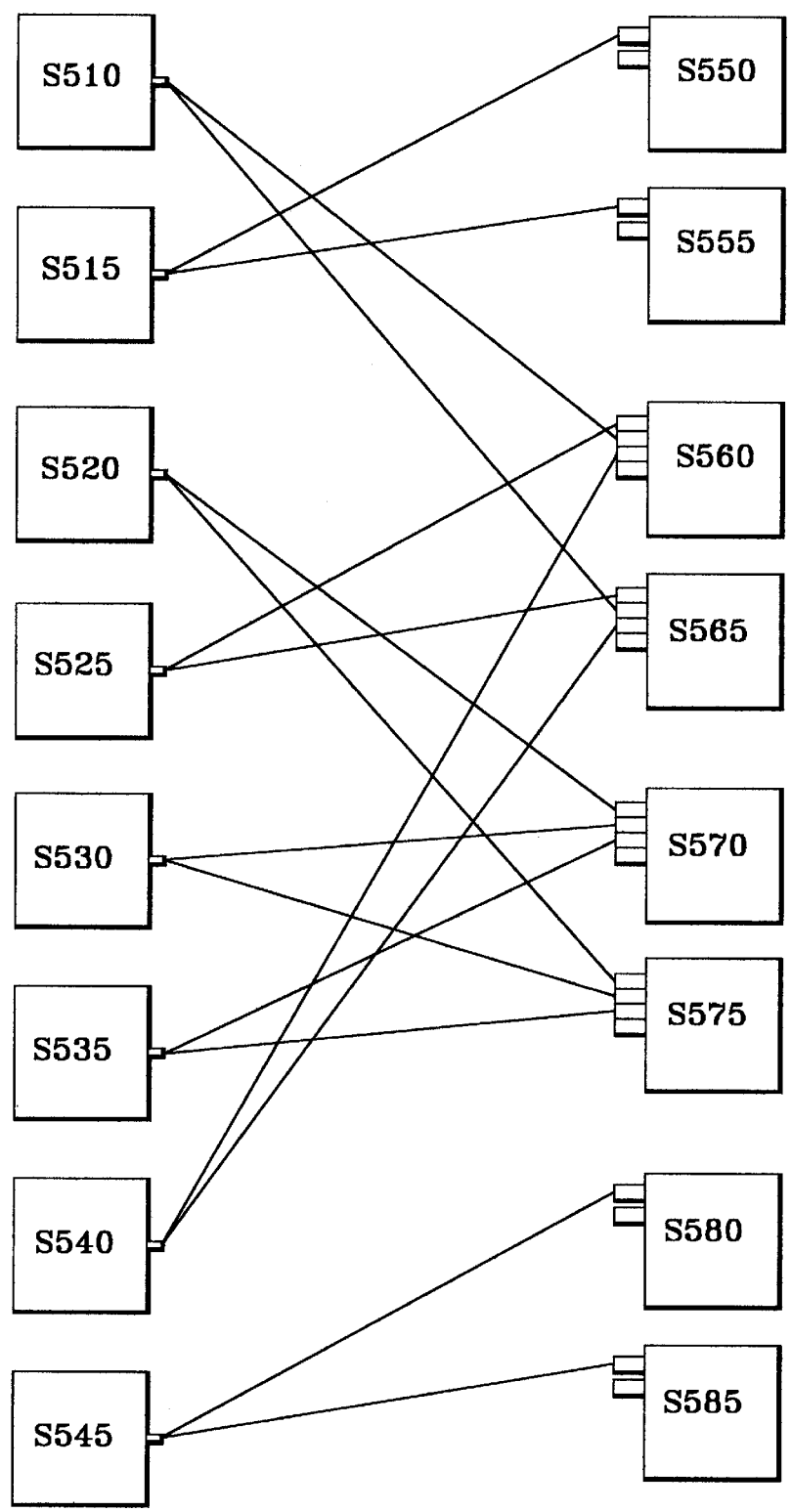

FIGS. 5 and 6 show diagrams illustrating Visual Basic code and ActiveX controls performing an embodiment of methods in accordance with the invention. Steps S200–S410 (FIG. 5) and S500–S585 (FIG. 6) are listed in Table 2 below.

TABLE 2

Steps of an embodiment method

| | |
|---|---|
| S200 | Start data sampling |
| S205 | Dataclk |
| S210 | MVFlow mA |
| S215 | MVPress mA |
| S220 | MVTemp mA |
| S225 | XducrP mA |
| S230 | LoPress Constant 1.5 PSIG |
| S235 | Thermist CJC |
| S240 | Thermist Treturn avg |
| S245 | Treturn probe |
| S250 | Store Treturn in RAM |
| S255 | Compare Psupply/LoPress |
| S260 | HiLoChk Psupply |
| S265 | HiPress Constant 150 PSIG |
| S270 | Compare Psupply/HiPress |
| S275 | Memenabl and Record |
| S280 | MVFlow avg |
| S285 | Convert MVFlow to GPM |
| S290 | MVFlow probe |
| S295 | MVPress avg |
| S300 | Convert Psupply to PSIG |
| S305 | Psupply probe |
| S310 | Store MVFlow in RAM |
| S315 | Store Psupply in RAM |
| S320 | MVTemp avg |
| S325 | Convert Tsupply to deg C. |

TABLE 2-continued

Steps of an embodiment method

| | |
|---|---|
| S330 | Tsupply probe |
| S340 | Store Tsupply in RAM |
| S345 | XducrP avg |
| S350 | Convert Preturn to PSIG |
| S355 | Preturn probe |
| S360 | Store Preturn in RAM |
| S365 | Calculate dT deg C. |
| S370 | dT probe |
| S375 | dP probe |
| S380 | Store dT in RAM |
| S385 | Calculate dP PSIG |
| S390 | Store dP in RAM |
| S400 | Calculate heatload KW |
| S405 | Store heatload in RAM |
| S410 | Heatload probe |
| — | — |
| S510 | Fetch val Treturn deg C. |
| S515 | Fetch val MVFlow GPM |
| S520 | Fetch val Psupply PSIG |
| S525 | Fetch val Tsupply deg C. |
| S530 | Fetch val Preturn PSIG |
| S535 | Fetch val dP PSIG |
| S540 | Fetch val dT deg C. |
| S545 | Fetch val heatload LW |
| S550 | Store MVFlow data in DB |
| S555 | Display MVFlow trend |
| S560 | Store Tsupply data in DB |
| S565 | Display Tsupply trend |
| S570 | Store Psupply data in DB |
| S575 | Display Psupply trend |
| S580 | Store Heatload data in DB |
| S585 | Display Heatload trend |

WORKING EXAMPLE

The invention will be further clarified by considering the following working example, which is intended to be purely exemplary of the use of the invention. A prototype system was made to verify the methods described and to test the system for a coolant recirculation system used in a high-power laser application.

To ensure accuracy within the typical flow rate range, calculations were performed to establish the design boundaries for this application. The following information in Table 3 itemizes the values for parameters and physical properties applicable to the system:

TABLE 3

Parameters and physical properties, prototype system

| Parameter/Physical Properties | Value/Limit |
|---|---|
| Reynolds (rod) No. | >2300 (min.) |
| Flow rate (minimum) | 2.0 GPM |
| Reynolds No. at 4.5 GPM | 4061 |
| Flow rate (maximum) | 89.4 GPM |
| Pressure Loss (Pri. Element) at 4.5 GPM | 0.19 PSIG |
| Turndown (range) | 8:1 |
| Differential Pressure (maximum) | 54 psi |

The prototype system has two 24 KW electrically driven heat-load emulators or heat-generation units connected in parallel, allowing a heat-load emulation range of 0 to 48 KW. The heater elements are thermostatically controlled via the outlet temperature, so that the heat generation can be adjusted within a range from 0 to 48 KW. The adjustment range can of course be varied by varying the number and power of the heat-load emulators.

The prototype system also includes an instrumentation unit interconnected with the heat-load emulator with 0.75 inch flexible hose with threaded female hose connectors compatible with an existing heat exchanger. The instrumentation unit has a supply leg and a return leg. Each leg has an inlet and an outlet port having 0.75 inch threaded male (hose) pipe ends. Valves are installed on the inlet/outlet ports as required for flow throttling and isolation during the attachment and/or removal from the facility's chilled water system hook-ups. The supply leg has a multi-variable meter for measuring flow rate, supply pressure, and supply temperature with only one intrusion into the existing piping assembly. The return leg has two taps, for a pressure transmitter and thermistor (or RTD) which monitored pressure and temperature respectively. The analog output signals from the instrumentation in each leg is connected to a data logger for storing sequential information on the individual parameters being monitored. Also, there is a power supply within the case, providing the required 25 volt DC voltage to the meter transmitters. This prototype system also requires a 3-phase 480 volt external AC power source.

The system is made of suitable size and weight so that it can be easily transported to a desired site for evaluating an existing chilled coolant system using various heat loads/flow rates for an extended time period. System parameters can be monitored and recorded at specific time intervals during this period. A general-purpose computer retrieves data from the data logger for plotting the performance trend of each parameter. From these trends, the system operation is evaluated as to capability and limitations for the chilled coolant supply.

Operational data from an existing heat exchanger (used for a high-power laser system) was reviewed, and the actual ranges and limits were established for the process parameters to be controlled and monitored. This review produced the following results for the chilled water supply/return connected to the existing heat exchanger (Table 4):

TABLE 4

Results of prototype testing

| Parameter | Units | Typical | Upper limit | Range optimum value |
| --- | --- | --- | --- | --- |
| Flow rate, Supply | GPM | 4.0 to 4.5 | 10 | 0 to 10 |
| Pressure, Supply | PSIG | 28 to 32 | 62 | 0 to 100 |
| Temp., Supply | °C. | 10 to 15 | 23 | 0 to 100 |
| Pressure, Return | PSIG | 17 to 27 | 35 | 0 to 150 |
| Temp., Return | °C. | 35 to 42 | 45 | 0 to 100 |
| Heat Output | KW | 26 | 55 | 0 to 32 |

The 55 KW upper limit was the maximum heat dissipation produced by the current/voltage capacity of the laser power supply. In this application, a portion of this energy is utilized by the laser, and a portion is radiated and/or convected to the local environment. It is estimated that only 50% to 75% of the heat generated was dissipated via the heat exchanger.

For this working example of the present invention, commercially available instrumentation was modified as described above to provide a versatile meter which can measure multiple parameters. The modified instrumentation required only one penetration into the piping system for monitoring flow rate, static pressure, and temperature. The unit is comprised of a transmitter for calculating a fully compensated flow rate and formatting the data into a standard 4 to 20 milliampere output signal, and a primary element containing a flow meter sensor consisting of two annubars (high and low pressure) and a RTD thermowell within a threaded pipe section of 0.75 inch diameter. The transmitter is mounted on the primary element via a manifold interface with isolation valves for ease in disassembly. In the piping assembly, the transmitter is mounted so as to ensure proper venting. In order to ensure a fully developed flow profile for accurate measurement, an installation that maintains a straight run of piping eight pipe diameters in length upstream of the sensor and four pipe diameters in length downstream of the sensor is recommended.

The output signal from the flowmeter assembly described above is connected to a tri-loop analog signal converter. With such a connection, the three primary signals associated with the measured parameters (flow, pressure, and temperature) are separately provided. The individual data for each parameter can be sent to a data logger for recording and storage.

Programmed into the transmitter electronics are the specified ranges of each measured parameter, conversion factors, settings, etc. Furthermore, the output signal is calibrated for the low and high values of each range. To change any of the ranges and application settings, the transmitter can be reprogrammed in the field or at the factory, using suitable software and suitable conventional communication connections.

Thus, in using the apparatus of the present invention, the heat removal capacity of a coolant-recirculating heat exchanger system is evaluated by providing a heat load having an inlet and an outlet, measuring coolant flow rate, measuring coolant temperature at the inlet and recording an inlet temperature, measuring coolant temperature at the outlet and recording an outlet temperature, and using the coolant flow rate, inlet temperature, and outlet temperature to calculate heat removal capacity. The heat load may be the actual equipment to be cooled by the coolant-recirculating heat exchanger system, or it may be one or more heaters for emulating the equipment to be cooled by the heat exchanger system. The parameter measurements may be repeated at predetermined time intervals while recording the coolant flow rate, inlet temperature, and outlet temperature for each time interval. The heat removal capacity may also be calculated for each time interval. The heat removal capacity may thus be characterized as a function of time. Such a time-dependent characterization is useful when various heat loads are varying or are being put into operation or shut down during the test period.

The apparatus may also be used by measuring coolant pressure at the inlet and outlet, recording inlet and outlet pressures, and subtracting the outlet pressure from the inlet pressure to determine pressure drop across the heat load. Again, the measurements of pressure and pressure drop can be repeated at predetermined time intervals while recording the inlet pressure and outlet pressure for each time interval to characterize pressure stability of the coolant-recirculating heat exchanger system.

INDUSTRIAL APPLICABILITY

The apparatus and methods of the present invention are useful for testing, characterizing, and monitoring coolant recirculation systems in industrial applications. In use, the apparatus is connected into an existing heat-exchanger system (either in place of the intended equipment to be cooled or in addition to existing equipment). The actual flow rates, temperatures, and pressures are measured and logged by the data logger, at suitable predetermined programmable intervals, over a period that may include a number of days. Logged data is analyzed by the computer, using known energy-transfer calculations, to provide various functions, e.g., a) informing a user about performance of a system by using spreadsheets and/or charts to display the data and derived parameters;
b) informing a user about trends occurring in the existing heat-exchanger system, such as peak heat loads at certain times of the day, etc.;
c) determining whether or not the existing heat-exchanger system has the actual capacity needed for new equipment to be installed; and
d) verifying experimentally that an existing heat-exchanger system can actually handle a particular intended new heat load.

This latter application is generally much more cost-effective than installing the actual planned equipment, and can be done before installing the planned equipment, to prevent delays and downtime when actual equipment is delivered and installed, and to prevent unexpected inadequate performance.

From the foregoing description, one skilled in the art can easily ascertain the essential characteristics of this invention, and without departing from the spirit and scope thereof, can make various changes and modifications of the invention to adapt it to various usages and conditions.

Other embodiments of the invention will be apparent to those skilled in the art from a consideration of this specification or from practice of the invention disclosed herein. For example, the slope of a change or trend in coolant system parameters may be calculated in real time, so that the monitoring system can initiate a control action before a critical parameter is exceeded. For another example, logged data may be recorded in a storage medium such as a diskette, and the logged data may be analyzed offline using a general purpose computer. For yet another example, the data logger and/or computer may be disposed remotely from the system being characterized and connected to it only by network connections, such as the Internet. This latter capability allows the cooling system to be remotely monitored and controlled by factory engineers and technicians. It is intended that the specification and examples disclosed herein be considered as exemplary only, with the true scope and spirit of the invention being defined by the following claims. Accordingly, the scope of the invention should be determined not by the embodiments illustrated, but by the appended claims and their legal equivalents.

Having described our invention, we claim:

1. Apparatus for characterizing heat removal capacity of a coolant-recirculating heat exchanger, said apparatus comprising:
   a) a heat load, said heat load having an inlet and an outlet for coolant;
   b) a flow meter disposed at one of said inlet and outlet for measuring flow rate of said coolant, said flow meter having a first data output;
   c) an inlet thermometer disposed at said inlet for measuring coolant inlet temperature, said inlet thermometer having a second data output;
   d) an outlet thermometer disposed at said outlet for measuring coolant outlet temperature, said outlet thermometer having a third data output; and
   e) a data recorder connected to said flow meter, inlet thermometer, and outlet thermometer for recording said first, second, and third data outputs, said data recorder having a fourth data output including data representing said flow rate, coolant inlet temperature, and coolant outlet temperature, whereby said coolant-recirculating heat exchanger system is characterized.

2. Apparatus as recited in claim 1, further comprising:
   f) a computer connected to said fourth data output of said data recorder, said computer being operable for computing heat removal capacity.

3. Apparatus as recited in claim 2, wherein said data recorder is integral with said computer, and said heat removal capacity is calculated from said first, second, and third data outputs.

4. Apparatus as recited in claim 1, wherein said heat load comprises equipment to be cooled by said coolant-recirculating heat exchanger system.

5. Apparatus as recited in claim 1, wherein said heat load comprises at least one heater for emulating equipment to be cooled by said coolant-recirculating heat exchanger system.

6. Apparatus as recited in claim 5, wherein said heat load comprises a multiplicity of heaters.

7. Apparatus as recited in claim 4, wherein said heat load comprises at least one electrically energized heater.

8. Apparatus for characterizing heat removal capacity of a coolant-recirculating heat exchanger system, said apparatus comprising in combination:
   a) heat-load emulating means, said heat-load emulating means having an inlet and an outlet for coolant;
   b) flow-rate measuring means having a first output representing coolant flow rate;
   c) means for measuring coolant inlet temperature and providing a second output representing coolant inlet temperature;
   d) means for measuring coolant outlet temperature and providing a third output representing coolant outlet temperature; and
   e) data recording means connected to said flow-rate measuring means and to said means for measuring coolant inlet temperature and outlet temperature, for recording said first, second, and third outputs respectively, said data recorder having a fourth data output including data representing said flow rate, coolant inlet temperature, and coolant outlet temperature, whereby said coolant-recirculating heat exchanger system is characterized.

9. Apparatus as recited in claim 8, further comprising:
   f) computing means connected for computing heat removal capacity from said first, second, and third outputs, said computing means being operable according to instructions for computing heat removal capacity.

10. Apparatus as recited in claim 9, wherein said data recording means (e) is integral with said means for computing (f), for allowing said heat removal capacity to be computed from said first, second, and third outputs.

11. A method for evaluating heat removal capacity of a coolant-recirculating heat exchanger system, comprising the steps of:
   a) providing a heat load having an inlet and an outlet;
   b) measuring and recording coolant flow rate;
   c) measuring coolant temperature at said inlet and recording an inlet temperature;
   d) measuring coolant temperature at said outlet and recording an outlet temperature; and
   e) combining said coolant flow rate, inlet temperature, and outlet temperature suitably to calculate heat removal capacity.

12. The method of claim 11, wherein said heat load comprises equipment to be cooled by said coolant-recirculating heat exchanger system.

13. The method of claim II, wherein said heat load comprises at least one heater for emulating equipment to be cooled by said coolant-recirculating heat exchanger system.

14. The method of claim 11, further comprising the step of:
   repeating steps (b), (c), and (d) at predetermined time intervals while recording said coolant flow rate, inlet temperature, and outlet temperature for each time interval.

15. The method of claim 11, further comprising the step of:
   repeating steps (b), (c), (d), and (e) at predetermined time intervals while recording said coolant flow rate, inlet temperature, outlet temperature, and heat removal capacity for each time interval.

16. The method of claim 11, further comprising the steps of:
   f) increasing said heat load;
   g) while monitoring a predetermined parameter sensitive to heat and having a predetermined threshold, repeating steps (a) through (f) until said parameter reaches said predetermined threshold; and
   h) when said parameter reaches said predetermined threshold, recording and reporting the resultant heat capacity as maximum heat removal capacity.

17. The method of claim 16 wherein said predetermined parameter sensitive to heat is a coolant return temperature.

18. The method of claim 16 wherein said predetermined parameter sensitive to heat is a temperature measured at equipment to be cooled by said coolant-recirculating heat exchanger system.

19. The method of claim 16 wherein said predetermined parameter sensitive to heat is a predetermined characteristic of product made by equipment to be cooled by said coolant-recirculating heat exchanger system.

20. The method of claim 19 wherein said product made by equipment to be cooled by said coolant-recirculating heat exchanger system is a semiconductor product and said predetermined characteristic of said product is a critical dimension.

21. The method of claim 11, further comprising the steps of:
   f) measuring coolant pressure at said inlet and recording an inlet pressure;
   g) measuring coolant pressure at said outlet and recording an outlet pressure; and
   h) subtracting said outlet pressure from said inlet pressure to determine pressure drop across said heat load.

22. The method of claim 21, further comprising the step of:
   repeating steps (f) and (g) at predetermined time intervals while recording said inlet pressure and outlet pressure for each time interval to characterize pressure stability of said coolant-recirculating heat exchanger system.

23. The method of claim 21, further comprising the step of:
   repeating steps (f), (g), and (h) at predetermined time intervals while recording said inlet pressure, outlet pressure, and pressure drop for each time interval.

24. Apparatus for characterizing heat removal capacity of a coolant-recirculating heat exchanger system having an inlet and an outlet for coolant for cooling a first heat load, said apparatus comprising:
   a) a flow meter disposed for measuring flow rate of said coolant, said flow meter having a first data output;
   b) an inlet thermometer disposed at said inlet for measuring coolant inlet temperature, said inlet thermometer having a second data output;
   c) an outlet thermometer disposed at said outlet for measuring coolant outlet temperature, said outlet thermometer having a third data output; and
   d) a data recorder connected to said first data output of said flow meter, to said second data output of said inlet thermometer, and to said third data output of said outlet thermometer for recording said first, second, and third data outputs, said data recorder having a fourth data output including data representing said flow rate, coolant inlet temperature, and coolant outlet temperature, whereby said coolant-recirculating heat exchanger system is characterized.

25. The apparatus of claim 24, further comprising:
   e) a second heat load for emulating said first heat load.

26. Apparatus for characterizing heat removal capacity of a coolant-recirculating heat exchanger system for cooling a heat load having a maximum heat output, said apparatus comprising in combination:
   a) heat-load emulating means, said heat-load emulating means being capable of producing heat over a range including the maximum heat output of said heat load, and said heat-load emulating means having an inlet and an outlet for coolant;
   b) flow-rate measuring means having a first output representing coolant flow rate;
   c) means for measuring coolant inlet temperature and for providing a second output representing coolant inlet temperature;
   d) means for measuring coolant outlet temperature and for providing a third output representing coolant outlet temperature; and
   e) data recording means connected to said flow-rate measuring means and to said means for measuring coolant inlet temperature and outlet temperature, for recording said first, second, and third outputs respectively, said data recorder having a fourth data output including data representing said flow rate, coolant inlet temperature, and coolant outlet temperature, whereby said coolant-recirculating heat exchanger system is characterized.

27. A method for evaluating heat removal capacity of a coolant-recirculating heat exchanger system having a maximum first heat load, comprising the steps of:
   a) providing a second heat load for emulating the first heat load, the second heat load having an inlet and an outlet;
   b) measuring and recording coolant flow rate through the coolant-recirculating heat exchanger system;
   c) measuring coolant temperature at said inlet and recording an inlet temperature;
   d) measuring coolant temperature at said outlet and recording an outlet temperature; and
   e) combining said coolant flow rate, inlet temperature, and outlet temperature suitably to calculate heat removal capacity.

28. The method of claim 27, further comprising the steps of:
   f) measuring a first coolant pressure at said inlet and recording the resultant measurement as an inlet pressure;
   g) measuring a second coolant pressure at said outlet and recording the resultant measurement as an outlet pressure; and
   h) subtracting said outlet pressure from said inlet pressure to determine the pressure difference across said heat load.

29. The method of claim 27, further comprising the step of:
   i) initiating a control action to control the coolant-recirculating heat exchanger system.

* * * * *